US009995990B2

(12) United States Patent
Lim et al.

(10) Patent No.: US 9,995,990 B2
(45) Date of Patent: Jun. 12, 2018

(54) REMOVABLE CAMERA LENS COVER

(71) Applicant: GoPro, Inc., San Mateo, CA (US)

(72) Inventors: Way Chet Lim, Menlo Park, CA (US);
Andrew Liu, San Carlos, CA (US);
Margaret Birmingham Mittan,
Piedmont, CA (US); Daniel Lee Sobel,
San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 336 days.

(21) Appl. No.: 14/970,323

(22) Filed: Dec. 15, 2015

(65) Prior Publication Data

US 2017/0168374 A1     Jun. 15, 2017

(51) Int. Cl.
| *G03B 17/00* | (2006.01) |
| *G03B 11/06* | (2006.01) |
| *G03B 11/04* | (2006.01) |
| *G03B 17/12* | (2006.01) |
| *G03B 17/55* | (2006.01) |
| *G03B 17/08* | (2006.01) |

(52) U.S. Cl.
CPC ............ *G03B 11/06* (2013.01); *G03B 11/041* (2013.01); *G03B 17/08* (2013.01); *G03B 17/12* (2013.01); *G03B 17/55* (2013.01)

(58) Field of Classification Search
USPC ......................................................... 396/448
See application file for complete search history.

(56) References Cited

U.S. PATENT DOCUMENTS

| 2004/0240870 A1* | 12/2004 | Stiehler ................. | G03B 11/06 396/103 |
| 2009/0091827 A1* | 4/2009 | Gauger .................. | G02B 23/16 359/511 |
| 2015/0093104 A1* | 4/2015 | Clyne ..................... | G03B 11/04 396/448 |
| 2017/0102512 A1* | 4/2017 | Yamaoda ............... | G02B 7/006 |

* cited by examiner

*Primary Examiner* — Rodney Fuller
(74) *Attorney, Agent, or Firm* — Young Basile Hanlon & MacFarlane, P.C.

(57) ABSTRACT

A camera is configured for use with a removable camera lens cover, which can be secured to or removed from the camera by a user without the use of a tool set. The mechanism which allows the lens cover to be secured to and removed from the camera includes a set of wires embedded into the lens cover and a set of wedges protruding from the lens wall of the camera. To secure the lens cover to the camera, the lens cover is placed onto the front of the camera and rotated until the wires align with corresponding wedges, securing the wires underneath the tapered surface of the wedges. To remove the lens cover from the camera, a force is applied outward and normal to the lens cover, causing the wires to flex outward and enabling the rotation and removal of the lens cover from the camera.

19 Claims, 7 Drawing Sheets

REMOVABLE CAMERA LENS COVER

BACKGROUND

Technical Field

This disclosure relates to cameras, and more specifically, to a removable lens cover for a camera.

Description of the Related Art

Digital cameras are increasingly used in outdoors and sports environments. Lens covers protect a camera lens from damage in such environments. However, lens covers themselves may become scratched or otherwise damaged during use. Replacing lens covers traditionally requires the use of extensive tool sets in a labor-intensive process. Accordingly, there is a need for a simplified lens cover replacement system for action cameras used in outdoors and sports environments.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

In one embodiment, a camera is configured for use with a removable camera lens cover. The lens cover can be secured to or removed from the camera by a user without the use of a tool set. The mechanism which allows the lens cover to be secured to and removed from the camera includes a set of wires embedded into the lens cover and a set of wedges protruding from the lens wall of the camera. The wires are secured onto a rear surface of the lens cover with a securing mechanism, such as screws. The wedges protrude from the outside surface of the lens wall opposite each other and taper outwards towards the normal plane of the lens wall. The lens cover includes a hole within the rear surface of the lens cover to accommodate the lens wall of the camera.

To secure the lens cover to the camera, the lens cover is placed over the lens wall of the camera such that the hole within the rear surface of the lens cover is aligned with the lens wall and until the rear surface of the lens cover abuts a front surface of the lens wall. Subsequently, the lens cover is rotated relative to the camera until each wire aligns with a corresponding different wedge. In this configuration, the wires of the lens cover are secured underneath the tapered surface of the wedges of the camera, preventing the lens cover from being removed from or rotating relative to the camera. To remove the lens cover from the camera in the same embodiment, a force is applied to the lens cover away from and normal to the front surface of the camera. The applied force causes the wires of the lens cover to slide along the corresponding tapered surface of the wedges of the camera, flexing the wires outward and away from each other and enabling the rotation, and thereby removal, of the lens cover from the camera.

Example Camera System Configuration

Figure 1:
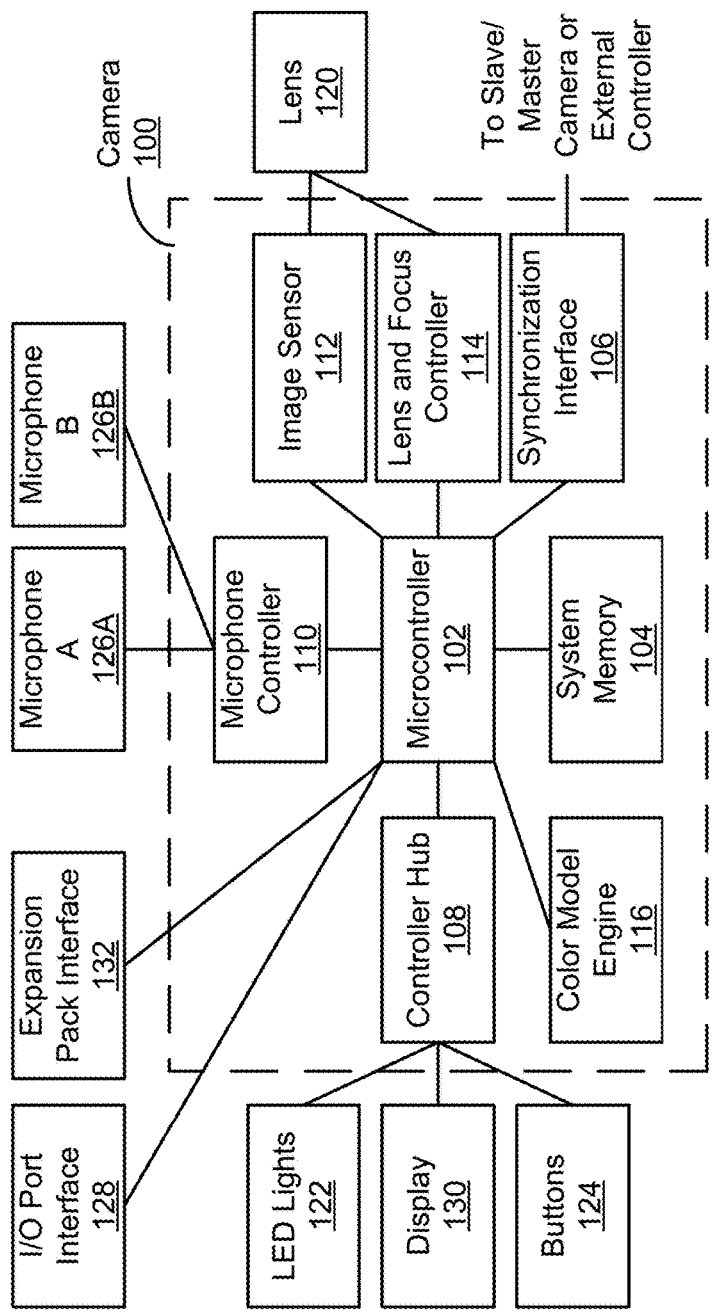
FIG. 1 illustrates the components of an example camera system, according to one embodiment.

FIG. 1 is a block diagram illustrating electronic components of a camera 100, according to one embodiment. The camera 100 of the embodiment of FIG. 1 includes one or more microcontrollers 102, a system memory 104, a synchronization interface 106, a controller hub 108, one or more microphone controllers 110, an image sensor 112, a lens and focus controller 114, a color model engine 116, one or more lenses 120, one or more LED lights 122, one or more buttons 124, one or more microphones 126, an I/O port interface 128, a display 130, and an expansion pack interface 132.

The camera 100 includes one or more microcontrollers 102 (such as a processor) that control the operation and functionality of the camera 100. For instance, the microcontrollers 102 can execute computer instructions stored on the memory 104 to perform the functionality described herein. It should be noted that although LUT generation and color model conversion are described herein as performed by the camera 100, in practice, the camera 100 can capture image data, can provide the image data to an external system (such as a computer, a mobile phone, or another camera), and the external system can generate a LUT based on the captured image data.

A lens and focus controller 114 is configured to control the operation, configuration, and focus of the camera lens 120, for instance based on user input or based on analysis of captured image data. The image sensor 112 is a device capable of electronically capturing light incident on the image sensor 112 and converting the captured light to image data. The image sensor 112 can be a CMOS sensor, a CCD sensor, or any other suitable type of image sensor, and can include corresponding transistors, photodiodes, amplifiers, analog-to-digital converters, and power supplies.

A system memory 104 is configured to store executable computer instructions that, when executed by the microcontroller 102, perform the camera functionalities described herein. The system memory 104 also stores images captured using the lens 120 and image sensor 112. The memory 104 can include volatile memory (e.g., random access memory (RAM)), non-volatile memory (e.g., a flash memory), or a combination thereof.

A synchronization interface 106 is configured to communicatively couple the camera 100 with external devices, such as a remote control, another camera (such as a slave camera or master camera), a computer, or a smartphone. The synchronization interface 106 may transfer information through a network, which allows coupled devices, including the camera 100, to exchange data other over local-area or wide-area networks. The network may contain a combination of wired or wireless technology and make use of various connection standards and protocols, such as WiFi, IEEE 1394, Ethernet, 802.11, 4G, or Bluetooth.

A controller hub 108 transmits and receives information from user I/O components. In one embodiment, the controller hub 108 interfaces with the LED lights 122, the display 130, and the buttons 124. However, the controller hub 108 can interface with any conventional user I/O component or components. For example, the controller hub 308 may send information to other user I/O components, such as a speaker.

A microphone controller 110 receives and captures audio signals from one or more microphones, such as microphone 126A and microphone 126B. The microphone controller 110 is configured to control the operation of the microphones 126. In some embodiments, the microphone controller 110 selects which microphones from which audio data is captured. For instance, for a camera 100 with multiple microphone pairs, the microphone controller 110 selects one microphone of the pair to capture audio data.

Additional components connected to the microcontroller 102 include an I/O port interface 128 and an expansion pack interface 132. The I/O port interface 128 may facilitate the camera 100 in receiving or transmitting video or audio information through an I/O port. Examples of I/O ports or interfaces include USB ports, HDMI ports, Ethernet ports, audioports, and the like. Furthermore, embodiments of the I/O port interface 128 may include wireless ports that can accommodate wireless connections. Examples of wireless ports include Bluetooth, Wireless USB, Near Field Communication (NFC), and the like. The expansion pack interface 132 is configured to interface with camera add-ons and removable expansion packs, such as an extra battery module, a wireless module, and the like.

Figure 2A:
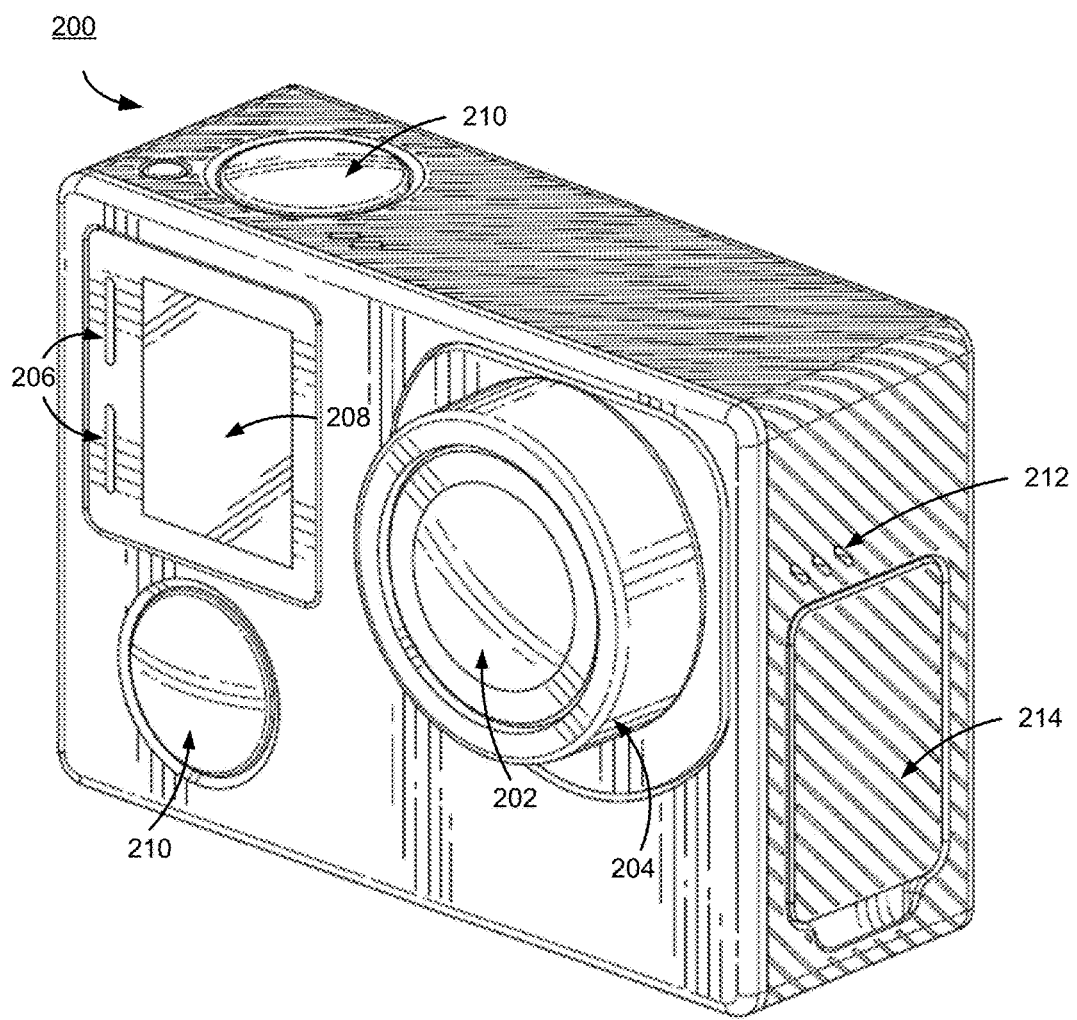
FIG. 2A illustrates a perspective view of a camera for use with the camera system, according to one embodiment.

FIG. 2A illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2A. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2A illustrates the I/O interface 214 enclosed by a protective door, the I/O interface can include any type or number of I/O ports or mechanisms, such as USC ports, HDMI ports, memory card slots, and the like.

Figure 2B:
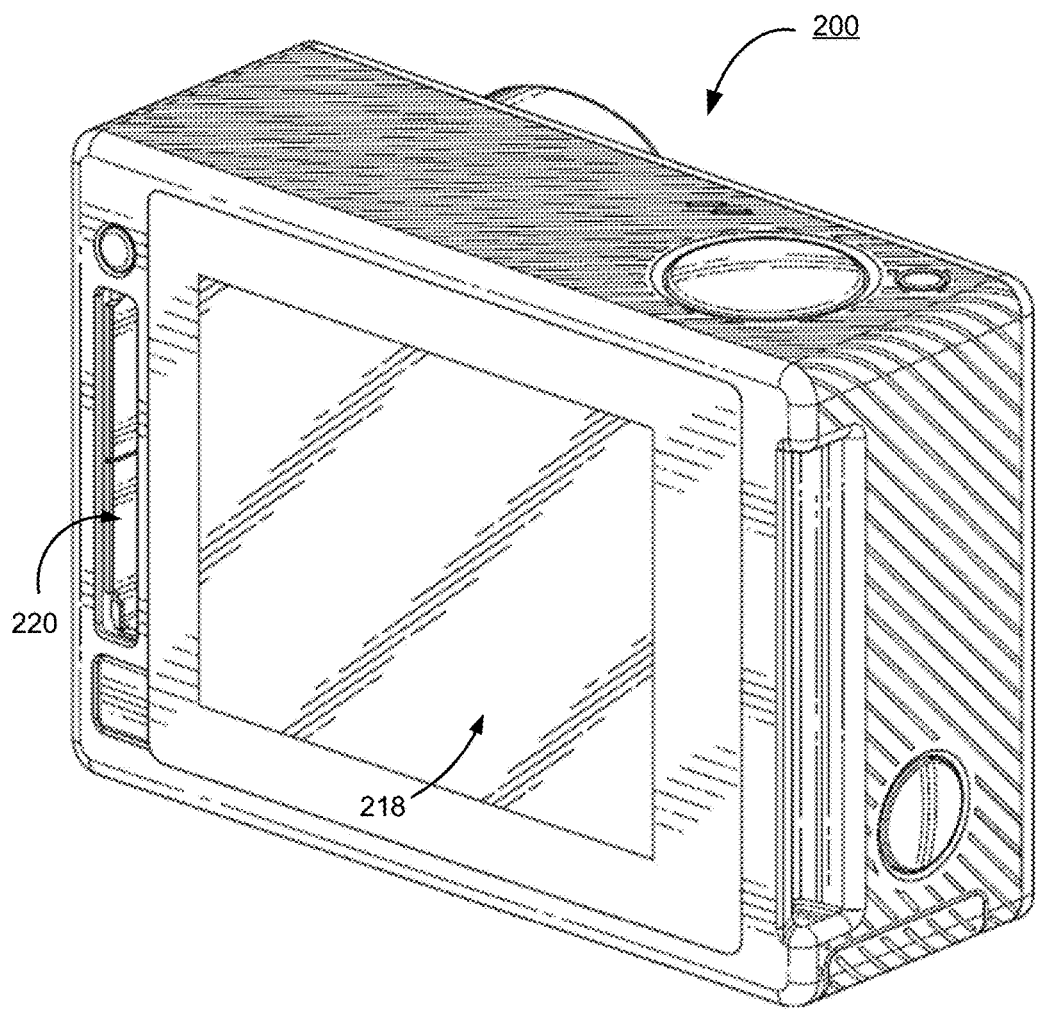
FIG. 2B illustrates a perspective view of a rear of a camera for use with the camera system, according to one embodiment.

FIG. 2B illustrates a perspective view of a rear of a camera 200 for use with the camera system, according to one embodiment. The camera 200 includes a display 218 configured to display camera information or image information (such as captured images or viewfinder images). The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Removable Camera Lens Cover

Figure 3A:
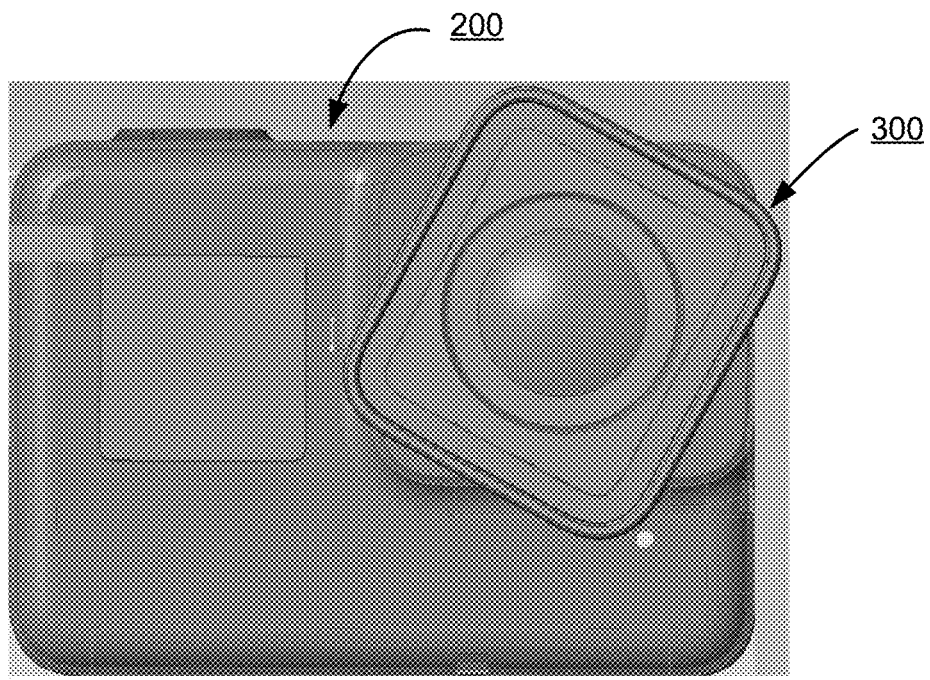
FIGS. 3A and 3B illustrate the rotation of a removable camera lens cover to secure the lens cover to a camera, according to one embodiment.
Figure 3B:
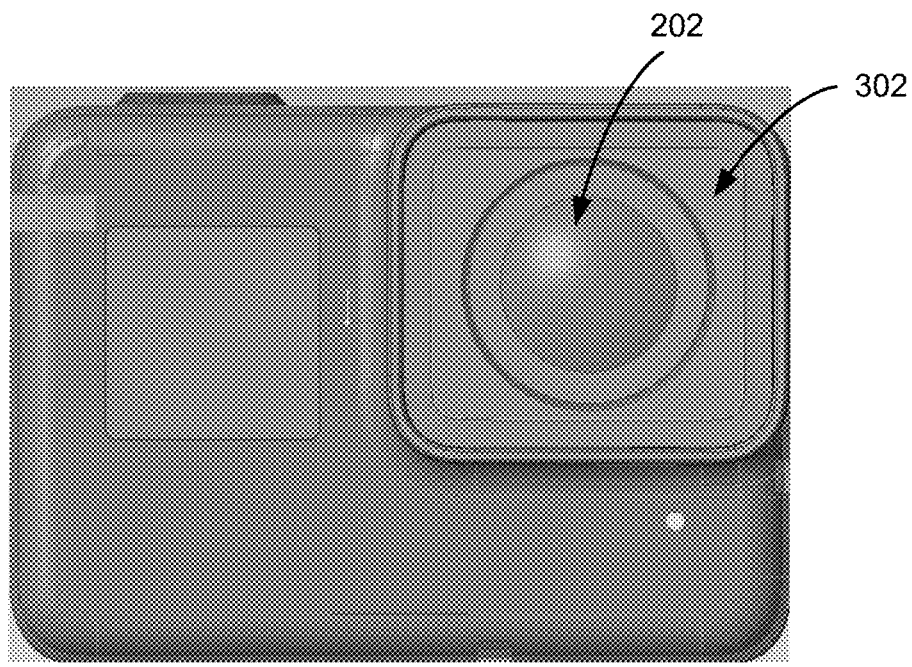

FIGS. 3A and 3B illustrate the rotation of a removable camera lens cover to secure the lens cover to a camera, according to one embodiment. In the embodiment of FIG. 3A, the removable lens cover 300 is placed over the lens of and onto the front surface of the camera 200 in a rotated position relative to the camera, illustrating an unlocked configuration. In the unlocked configuration, the removable lens cover 300 can be removed from the camera 200 or can be rotated and secured to the camera. In the embodiment of FIG. 3B, the removable lens cover 300 is shown in a locked configuration. In the locked configuration, the removable lens cover 300 is rotated from the unlocked configuration illustrated in FIG. 3A to the orientation illustrated in FIG. 3B, thereby securing the removable lens cover to the camera 200. In some embodiments, when the removable lens cover 300 is in the unlocked configuration, the removable lens cover can be rotated clockwise or counter-clockwise relative to the camera 200 to configure the removable lens cover into the locked configuration.

In the embodiments of FIGS. 3A and 3B, the removable lens cover 300 is substantially rectangular in shape with rounded corners, though in other embodiments, the removable lens cover can be any suitable shape. In some embodiments, the removable lens cover 300 includes an outer wall with a top segment, a bottom segment, a left segment, and a right segment. The removable lens cover also includes a transparent protective lens surface 302 affixed to the outer wall. In some embodiments, when the removable lens cover 300 is configured in the locked configuration, one or more of the top segment, the bottom segment, the right segment, and the left segment are either substantially parallel with one or more surfaces of the camera 200 or are substantially flush with one or more surfaces of the camera. For example, in the embodiment of FIG. 3B, the top segment and the right segment of the removable lens cover outer wall are substantially flush with the top surface and the right surface of the camera 200, respectively.

In the locked configuration shown in the embodiment of FIG. 3B, the protective lens surface 302 shields the lens 202 of the camera 200 from outside elements which can cause damage to the lens. A watertight seal is created between a rear surface of the removable lens cover 300 and a front surface of the camera 200, creating a cavity between the camera and the removable lens cover and preventing water, debris, and other outside elements from entering the cavity and causing damage to the camera. In some embodiments, a portion of the outer wall of the removable lens cover 300 is made of a thermally conductive material and acts as a heat sink for the excess heat created by camera components (such as image processors, image sensors, and the like) thermally coupled to the outer wall by a thermal conduit adjacent to or abutting the camera components and the outer wall. In the locked configuration shown in the embodiment of FIG. 3B, heat from the camera components is transferred to the thermal conduit (which can be located within the camera), to the outer front surface of the camera 200 under the removable lens cover 300, and to the thermally conductive material of the outer wall of the removable lens cover, where it is dissipated, for instance by water or air. These thermal channels provide a pathway to transfer the excess heat from internal camera components out of the camera 200 via the removable lens cover 300, preventing overheating and potential damage to the camera.

Figure 4:
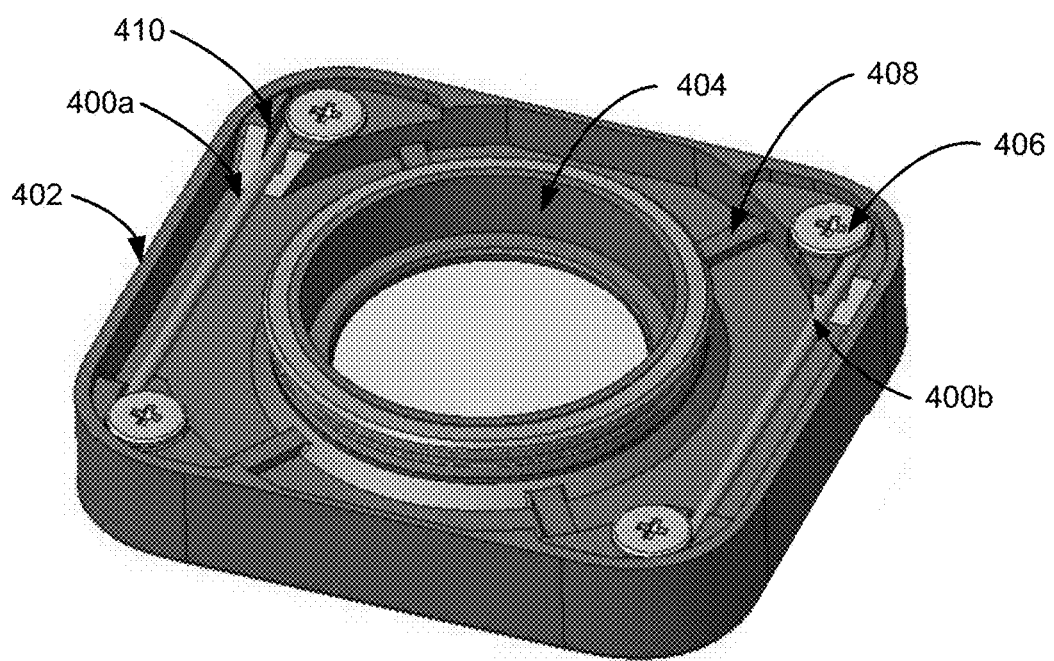
FIG. 4 illustrates a perspective view of a rear side of the removable camera lens cover of FIG. 3, according to one embodiment.

FIG. 4 illustrates a perspective view of a rear side of the removable camera lens cover of FIG. 3, according to one embodiment. The rear side of the removable lens cover 300 includes a lens hole 404 located in the center of the removable lens cover, aligning with the lens 202 of the camera 200 when the removable lens cover is configured in the locked configuration. Surrounding the lens hole 404 is a plurality of notches 408 protruding outward from the rear surface and radially away from the lens hole. In some embodiments, the plurality of notches 408 interlock with a reciprocal plurality of grooves on the camera 200 to ensure correct alignment of the removable lens cover 300 when it is configured in the locked configuration with the camera. In the embodiment of FIG. 4, the plurality of notches 408 are substantially rectangular in shape, but in other embodiments, the plurality of notches can be any shape, size, or configuration.

The rear side of the removable lens cover 300 also includes a plurality of flexible securing structures 400a and 400b (collectively "400" hereinafter). In the embodiment of FIG. 4, the flexible securing structures 400 can be a set of wires in a parallel configuration on opposite sides of the removable lens cover 300. In some embodiments, each end of each wire is embedded into a partial channel (such as partial channel 410) on the rear side of the removable lens cover 300. The ends of the wires are secured into the partial channels, for instance, using screws 406, latches, adhesives, or any suitable securing mechanism. In some embodiments, each end of a wire is embedded into one of a corresponding pair of partial channels, each partial channel in the pair of partial channels being substantially aligned and/or collinear. Spanning between each pair of partial channels is a clearance space for wedges of the camera 200 (as described below), beneficially allowing the wedges to abut the flexible securing structures 400 in the locked configuration. The material of the flexible securing structures 400 can be made of a type of metal, such as aluminum or steel, and can be rigid enough to retain its position in the locked configuration but flexible enough to allow the removable lens cover 300 to be removed from the camera 200. In other embodiments, the flexible securing structures 400 may be rods, cylinders, pins, dowels, and the like.

Figure 5:
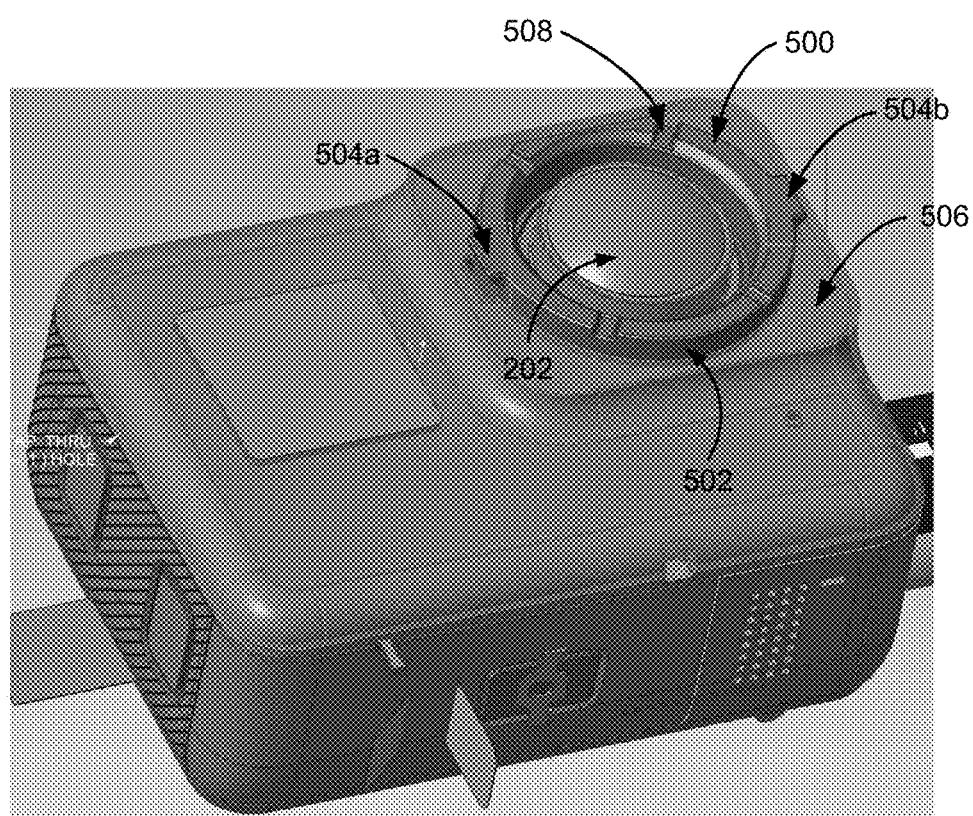
FIG. 5 illustrates a perspective view of a camera for use with a removable lens cover, according to one embodiment.

FIG. 5 illustrates a perspective view of a camera for use with a removable lens cover, according to one embodiment. In the embodiment of FIG. 5, the camera 200 includes a lens wall 500 which surrounds the lens 202. The lens wall 500 includes a plurality of wedges 504 that protrude and taper outwards from the outside surface 502 of the lens wall 500. In some embodiments, each wedge 504 corresponds to a reciprocal flexible securing structure 400 such that each wedge aligns with a reciprocal flexible securing structure when the removable lens cover 300 is in the locked configuration. In the embodiment of FIG. 5, each wedge 504 is configured such that it will secure a flexible securing structure 400 underneath the tapered surface of the wedge when the removable lens cover 300 is in the locked configuration. In such a configuration, the flexible securing structure substantially abuts a portion of the tapered surface of the wedge 504, preventing the removable lens cover 300 from rotating absent the application of an outward force being applied to the removable lens cover and securing the removable lens cover to the front surface 506 of the camera 200.

In some embodiments, each wedge 504 applies an outward force on the reciprocal flexible securing structure 400, but the applied force is less than a threshold force required to flex the flexible securing structure outward enough such that the removable lens cover 300 can be rotated relative to the camera 200.When a threshold force is applied on the removable lens cover outward and normal to the camera, the wedges 504 exert a corresponding force on the flexible securing structures 400, causing the flexible securing structures to flex outward and away from the lens wall 500, beneficially enabling the removable lens cover to rotate relative to the camera such that the removable lens cover can be configured from the locked configuration into the unlocked configuration, and thus removed from the camera 200.

The camera 200 also includes a plurality of grooves 508 indented into the top surface of the lens wall 500. The locations and shape of the plurality of grooves 508 correspond to the locations and shape of the plurality of notches 408 on the removable lens cover 300. Accordingly, when the removable lens cover 300 is in the locked configuration, each of the plurality of notches 408 is inserted into a corresponding groove 508, beneficially ensuring the correct alignment of the removable lens cover when it is in a locked configuration and further preventing the rotation of the removable lens cover.

Figure 6A:
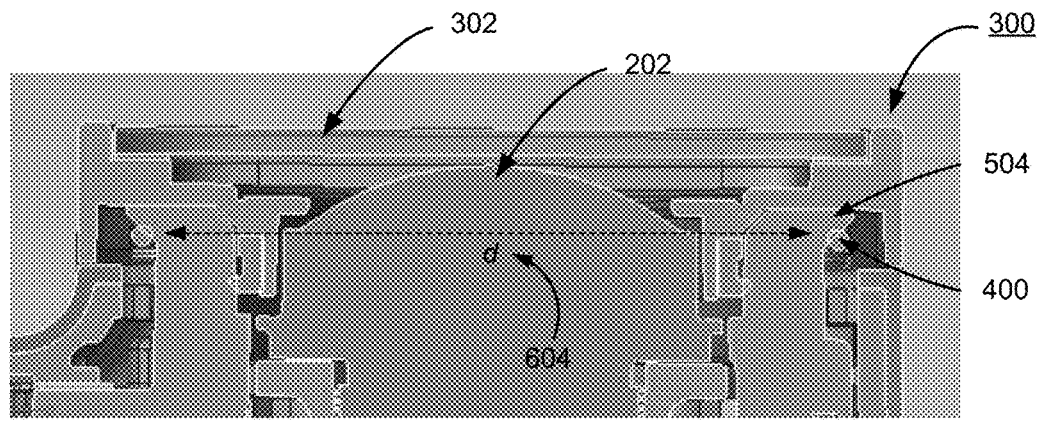
FIGS. 6A and 6B illustrate a cross-sectional view of a mechanism for securing a removable lens cover to a camera, according to one embodiment.

FIG. 6A illustrates a cross-sectional view of a mechanism for securing a removable lens cover to a camera, according to one embodiment. In the embodiment of FIG. 6A, the illustrated cross-section shows the camera 200 and the removable lens cover 300 in the locked configuration. In the locked configuration, the rear surface of the removable lens cover 300 abuts the lens wall 500, and the flexible securing structures 400 abut the tapered surfaces of the corresponding wedges 504 of the camera 200. In the embodiment of FIG. 6A, the distance d 604 represents the distance between the flexible securing structures 400. In the locked configuration, the distance d 604 is at its minimum length, allowing the plurality of flexible securing structures 400 to substantially retain their position underneath the plurality of wedges 504 and preventing the removable lens cover 300 from rotating relative to and being removed from the camera 200.

Figure 6B:
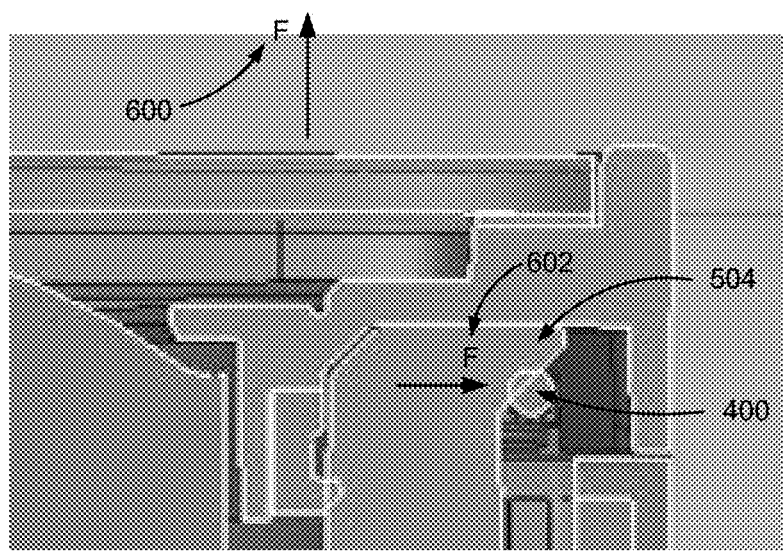

FIG. 6B illustrates a perspective, cross-sectional view of a mechanism for removing a removable lens cover from a camera, according to one embodiment. To remove the removable lens cover 300 from the camera 200, a threshold force 600 is applied to the removable lens cover by a user of the camera, outwardly normal to the front surface of the removable lens cover. For each of the wedges 504 in the plurality of wedges in the embodiment of FIG. 6B, when the threshold force 600 is applied, the threshold force causes the wedge to apply a reciprocal force 602 to the flexible securing structure 400, thereby causing the flexible securing structure to flex outward and slide along the tapered surface away from the lens wall 500. When the flexible securing structures 400 flex outward from the lens wall, the distance d 604 increases, thereby enabling the rotation and removal of the removable lens cover from the camera 200. In other embodiments, the wedges 504 are configured in an opposite configuration such that the threshold force 600 applied to the removable lens cover 300 is inwardly normal to the front surface of the removable lens cover, causing a reciprocal force to flex the flexible securing structures outward.

The embodiments shown in FIGS. 3 through 6 employ a rotating mechanism to secure the removable lens cover 300 to the camera 200. In other embodiments, the removable lens cover 300 could be attached to the camera 200 through other securing mechanisms, such as a sliding fit, a snapping fit, a threaded fit, and the like, which allow a user to easily secure and remove a removable lens cover from a camera without the use of a tool set.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for detachable camera mounts as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera system comprising:
    a camera comprising:
        a lens protruding from a front surface of the camera;
        a lens wall surrounding the lens, the outer lens wall comprising an outside surface;
        a set of wedges protruding from and tapered towards the outside surface of the lens wall, each wedge comprising a wedge surface angled relative to the outside surface of the outer lens wall; and
    a removable lens cover comprising:
        a lens hole within a rear surface of the removable lens cover, the lens hole configured to enclose the lens when the removable lens cover is secured to the camera;
        a protective lens surface within a front surface of the removable lens cover; and
        a set of flexible securing structures, each of the set of flexible securing structures configured to align with a corresponding different wedge of the set of wedges such that 1) when the removable lens cover is secured to the camera, the securing structures prevent the removable lens cover from rotating relative to the camera or being removed from the camera, and 2) when a threshold force is applied on the removable lens cover away from and normal to the front surface of the camera, a reciprocal force is applied by the set of wedges onto the securing structures, causing the securing structures to flex outward and away from each other, thereby enabling the rotation of the removable lens cover relative to and removal of the removable lens cover from the camera.

2. The camera system of claim 1, wherein the removable lens cover is substantially rectangular in shape with rounded corners.

3. The camera system of claim 1, wherein the removable lens cover may include an outer wall with a top segment, a bottom segment, a left segment, and a right segment.

4. The camera system of claim 3, wherein the protective lens surface is affixed to the outer wall.

5. The camera system of claim 1, wherein the camera and the removable lens cover can be configured in an unlocked configuration such that the removable lens cover can be removed from or rotated relative to the camera.

6. The camera system of claim 5, wherein the removable lens cover in the unlocked configuration can be rotated clockwise or counter-clockwise relative to the camera to configure the removable lens cover in a locked configuration.

7. The camera system of claim 1, wherein the camera and the removable lens cover can be configured in a locked configuration such that the removable lens cover is secured to the camera and prevented from rotating relative to the camera.

8. The camera system of claim 1, wherein the removable lens cover contains a hole within the rear surface of the lens cover that aligns with the lens of the camera in a locked configuration.

9. The camera system of claim 1, wherein two segments of the removable lens cover are either substantially parallel or are substantially flush with two surfaces of the camera when the removable lens cover is in a locked configuration.

10. The camera system of claim 1, wherein the set of flexible securing structures comprise one or more of: wires, rods, cylinders, pins, and dowels.

11. The camera system of claim 10, wherein each end of a flexible securing structure is embedded into a different one of a corresponding pair of partial channels on the rear surface of the removable lens cover.

12. The camera system of claim 11, wherein the pair of partial channels are substantially collinear.

13. The camera system of claim 11, wherein the pair of partial channels are separated by a clearance space.

14. The camera system of claim 11, wherein each end of the flexible securing structure is secured into a partial channel with a securing mechanism.

15. The camera system of claim 1, wherein each wedge secures a corresponding flexible securing structure underneath the tapered surface of the wedge when the removable lens cover is in a locked configuration.

16. The camera system of claim 1, wherein the camera further comprises a plurality of grooves within the front surface of the camera, and wherein the removable lens cover further comprises a corresponding plurality of notches protruding from the rear surface of the removable lens cover such that when the removable lens cover is secured to camera, each of the plurality of notches is aligned with and inserted into a corresponding groove.

17. The camera system of claim 1, wherein a portion of the outer wall of the removable lens cover comprises a thermally conductive material.

18. The camera system of claim 17, wherein the camera further comprises a chipset and a thermal conduit thermally coupled to the chip set and to the lens wall such that heat from the chipset is transferred to the thermal conduit, to the lens wall, and to the portion of the outer wall of the removable lens cover when the removable lens cover is secured to the camera.

19. A camera system comprising:
a camera comprising a lens and a first set of securing structures; and
a removable lens cover comprising:
  a protective lens surface; and
  a second set of flexible securing structures, each of the second set of flexible securing structures configured to align with a corresponding different securing structure of the first set of securing structures such that when the removable lens cover is configured in a locked configuration, the first set of securing structures and the second set of securing structures prevent the removable lens cover from rotating relative to the camera or being removed from the camera, and such that when a threshold force is applied to the removable lens cover away from the camera, the first set of securing structures and the second set of securing structure do not prevent the removable lens cover from rotating relative to the camera or being removed from the camera.

* * * * *